US011781019B2

(12) United States Patent
Hemsley, Jr. et al.

(10) Patent No.: US 11,781,019 B2
(45) Date of Patent: Oct. 10, 2023

(54) CRACK RESISTANT MICRO SURFACING COMPOSITION

(71) Applicant: Ergon Asphalt & Emulsions, Inc., Jackson, MS (US)

(72) Inventors: James M. Hemsley, Jr., Pearl, MS (US); Walter S. Jordan, Pearl, MS (US); Codrin Daranga, Madison, MS (US)

(73) Assignee: Ergon, Inc., Flowood, MS (US)

( * ) Notice: Subject to any disclaimer, the term of this patent is extended or adjusted under 35 U.S.C. 154(b) by 983 days.

(21) Appl. No.: 15/775,702

(22) PCT Filed: Nov. 11, 2016

(86) PCT No.: PCT/US2016/061482
§ 371 (c)(1),
(2) Date: May 8, 2020

(87) PCT Pub. No.: WO2017/083614
PCT Pub. Date: May 18, 2017

(65) Prior Publication Data
US 2021/0054210 A1    Feb. 25, 2021

Related U.S. Application Data

(60) Provisional application No. 62/254,998, filed on Nov. 13, 2015.

(51) Int. Cl.
*C08L 95/00* (2006.01)
*E01C 7/35* (2006.01)
(52) U.S. Cl.
CPC ............ *C08L 95/005* (2013.01); *E01C 7/353* (2013.01); *C08L 2201/52* (2013.01); *C08L 2555/28* (2013.01); *C08L 2555/80* (2013.01)
(58) Field of Classification Search
CPC ....................................................... C08L 95/00
USPC ........................................................ 106/277
See application file for complete search history.

(56) References Cited

U.S. PATENT DOCUMENTS 5,019,610 A * 5/1991 Sitz ..................... C08L 95/005
524/68
9,115,296 B2    8/2015 Kluttz et al.

FOREIGN PATENT DOCUMENTS

| CN | 102234434 A | 11/2011 | |
|---|---|---|---|
| CN | 103059583 A | 4/2013 | |
| CN | 104087003 A | 10/2014 | |
| WO | WO-0118122 A1 * | 3/2001 | ............ B01F 7/0045 |
| WO | WO 2017083614 | 5/2017 | |

OTHER PUBLICATIONS

ASTM D5-97, "Standard test method for penetration of bituminous materials," Jan. 1, 2009, 3 pages.
ASTM D 242/D 242M—09, "Standard specification for mineral filler for bituminous paving mixtures," Jan. 1, 2009, West Conshohocken, PA US, 2 pages.
Asphalt Emulsion Industries LLC Quality emulsion for every application, 2020, 2 pages.
Capitol Aggregates Inc, "Coarse Aggregate," 2021, 5 pages.
Asphalt Emulsion Industries, LLC, "CQS-1hLM product data sheet," 2013, 1 page.
Asphalt Emulsion Industries, LLC, "CQS-1h product data sheet," 2013, 1 page.
Asphalt Emulsion Industries, LLC, "CRS-1 product data sheet," 2013, 1 page.
"Flexible latex modified emulsion treatment (Flexible micro-surfacing) (Maintenance)," Virginia Department of Transport, Dec. 20, 2011, 7 pages.
Kraton, "Asphalt binder modification 101 series," 2019, 4 pages.
Miller et al., "Distress identification manual for the long-term pavement performance program," 2014, 169 pages.
Basic asphalt emulsion manual; MS-19, 4th Edition, Asphalt Institute and Asphalt Emulsion Manufacturers Association, Lexington, KY, USA, 2008, 110 pages.
"Selecting the right type and grade" and "Types of surface treatments," Basic Asphalt Emulsion Manual; MS-19, Lexington, Kentucky, USA, Asphalt Institute, Feb. 1, 2008, pp. 29-57.
ISSA A143, Recommended performance guideline for micro surfacing A 143 (revised Feb. 2010), 16 pages.
Scullion et al., "Design and performance evaluation of very thin overlays in Texas," Jun. 1, 2009, 80 pages.
2014 Test procedure for TxDOT Designation: Tex-248-F, Feb. 1, 2014, 8 pages.
TEX 248-F Addendum for flexible micro-surfacing (Nov. 16, 2012), 2 pages.
TEX DOT "Overlay test procedure," 2017, 13 pages.
Texas DOT Overlay test procedure, 2009-2013, 6 pages.
Texas DOT, "Aggregates for surface treatments," 2017, 3 pages.
Walubita et al., "The overlay tester (OT): Comparison with other crack test methods and recommendations for surrogate crack tests; Report 0-6607-2", Aug. 1, 2013, 180 pages.
Walubita et al., "The overlay tester: a sensitivity study to improve repeatability and minimize variability in the test results," Austin, Texas, Feb. 1, 2012, 153 pages.
W. Pierre Peltier, "Flexible micro surfacing," Mar. 1, 2010, 22 pages.
Shuqing et al., "High Grade Road Maintenance And Management," 1st edition, Southwest Jiaotong University Press, May 31, 2008, pp. 87-90.
Mannian et al., "Asphalt Production and Application Technology: Questions and Answers," 1st edition, May 31, 2005, p. 27.
Zhongping, "Surface Physical Chemistry," 1st edition, Tongji University Press, Sep. 30, 2015, pp. 318-320.
"Safety Data Sheet: Emulsified Asphalt Cationic, All Grades," Asphalt Emulsion Industries, LLC, Revision Date: Jun. 1, 2015, 12 pages.
European Communication 16801923.0-1102, dated Aug. 10, 2021, 12 pages.

(Continued)

*Primary Examiner* — Deve V Hall
(74) *Attorney, Agent, or Firm* — Patterson Thuente, P.A.

(57) ABSTRACT

A polymer-modified emulsion used for micro surfacing paving applications that results in a durable paving composition. The residue from the emulsion exhibits a resistance to cracking and an overall reduction in reflective cracking.

19 Claims, 2 Drawing Sheets

(56) References Cited

OTHER PUBLICATIONS

International Search Report and Written Opinion from PCT/US2016/061482, dated Mar. 3, 2017, 17 pages.
International Preliminary Report on Patentability from PCT/US2016/061482, dated May 24, 2018, 12 pages.
Examination Report for AU2016353233, dated Jun. 11, 2020, 5 pages.
Examination Report for AU2016353233, dated Oct. 2, 2020, 7 pages.
Office action from BR 112018009727-6, dated May 14, 2020, 7 pages.
Office action from BR 112018009727-6, dated Jan. 17, 2022, 6 pages.
Examiners Requisition from CA 3005330, dated Nov. 18, 2022, 4 pages.
Office action from CN 201680078745.7, dated May 28, 2020, 47 pages.
Office action from CN 201680078745.7, dated Mar. 2, 2021, 20 pages.
Rejection Decision from CN 201680078745.7, dated Aug. 2, 2021, 17 pages.
Communication from EP 16801923.0, dated Mar. 16, 2023, 4 pages.

* cited by examiner

CRACK RESISTANT MICRO SURFACING COMPOSITION

CROSS REFERENCE TO RELATED APPLICATIONS

This application is a national stage filing under 35 U.S.C. § 371 of International Application No. PCT/US/2016/061482 filed Nov. 11, 2016, which claims priority under 35 U.S.C. § 119 to U.S. Provisional Application No. 62/254,998 filed Nov. 13, 2015 the disclosures of all of which are incorporated herein by reference.

TECHNICAL FIELD

This invention relates to modified asphalt emulsions for road surface treatments.

BACKGROUND

Asphalt concrete, also known as asphalt pavement, is a composite material that includes mineral aggregate and an asphalt (bitumen) binder which hardens to form a robust surface. Asphalt pavement deteriorates over time from oxidation of asphalt binder, heavy loads and varying climatic conditions. One method for restoring or repairing deteriorated asphalt pavement is to remove and replace the existing pavement with either newly prepared or recycled pavement. Removal and replacement, however, is expensive and wasteful.

SUMMARY OF THE INVENTION

Rather than removing and replacing deteriorated pavement, it is preferable to restore the pavement using a surface treatment. In one aspect, this disclosure is directed at a polymer-modified asphalt emulsion comprising:
an asphalt phase comprising an asphalt and a polymer; and
an aqueous phase comprising water, and an emulsifying agent, wherein a residue recovered from the emulsion has a penetration value of 110-160 units according ASTM D5 and exhibits a resistance to cracking as demonstrated by a value according to the Overlay Test of greater than 50 cycles to failure. In certain embodiments, the residue from the emulsion exhibits a resistance to cracking as demonstrated by a value according to the Overlay Test of greater than 100 cycles to failure.

In another aspect, the polymer-modified asphalt emulsion is combined with aggregate to form a micro surfacing paving composition. The micro surfacing paving composition is then applied by conventional paving equipment as a preservation treatment for deteriorated pavement. The resulting surface formed by the aggregate filled residue provides enhanced durability over conventional micro surfacing compositions as demonstrated by the Overlay Test. For example, the resulting residue exhibits a substantially higher resistance to cracking than conventional micro surfacing formulation. The composition of this disclosure reduces reflective cracking that has become prevalent in standard micro surfacing compositions.

The disclosed polymer-modified asphalt emulsions are suitable for road maintenance for the preservation of deteriorated pavement, thereby extending the life and service of the pavement.

DETAILED DESCRIPTION

Figure 1:
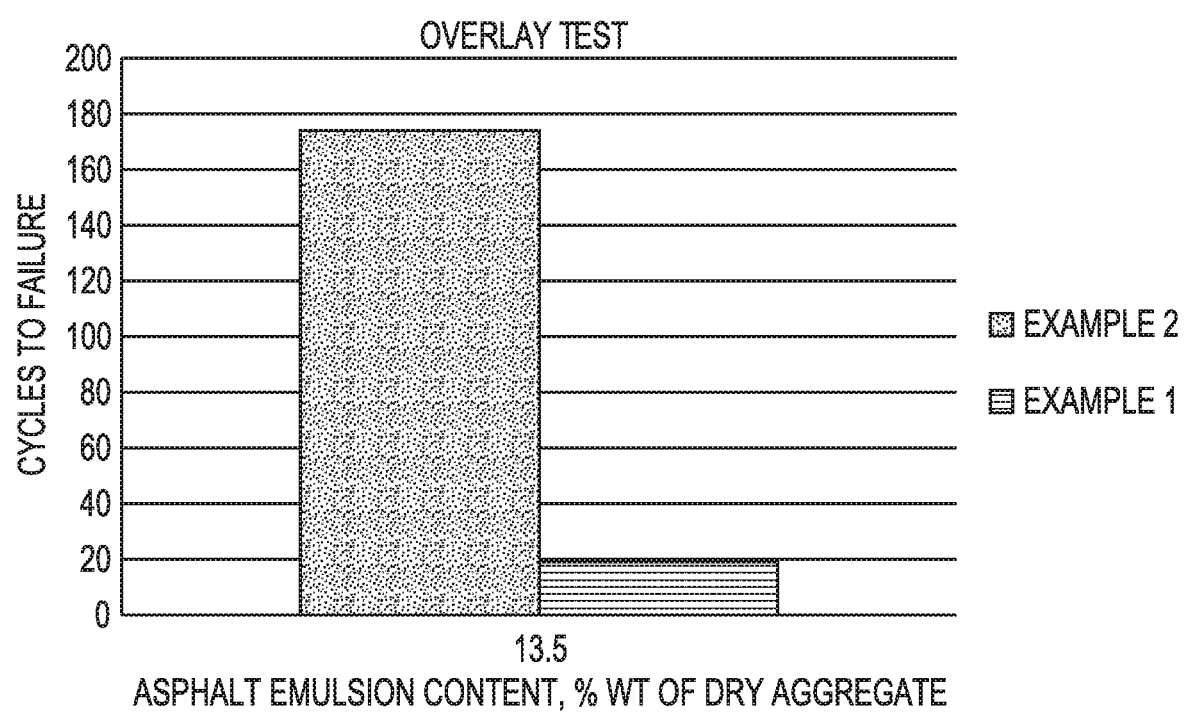
FIG. 1 is graph demonstrating the Overlay Test results for embodiments of this disclosure.

The term "about" refers to a range of numbers that is considered equivalent to the recited value (e.g., having the same function or result). In many instances, the term "about" may include numbers that are rounded to the nearest significant figure.

The term "deteriorated" refers to cracked, aged, oxidized or distressed asphalt pavement, for example distressed includes asphalt pavement identified by Miller, John S., and William Y. Bellinger. Distress identification manual for the long-term pavement performance program. No. FHWA-HRT-13-092. 2014.

The term "emulsifying agents" refer to surfactants (including biodegradable surfactants) and to stabilizing agents. Emulsifying agents maintain the asphalt material in a stable suspension and control the emulsion breaking time, where the breaking time is the time required for the emulsified asphalt materials to separate from the aqueous phase permitting water evaporation and formation of a cured or set coating.

The term "polymer" includes, independently, homopolymers, copolymers, terpolymers, block copolymers, segmented copolymers, graft copolymers, and any mixture or combination thereof.

The term "reflective cracking" means cracks or joints in a sub-surface layer that result in similar cracks in an overlayer.

Numerical ranges expressed using endpoints include all numbers subsumed within that range (e.g. 1 to 5 includes 1, 1.5, 2, 2.75, 3, 3.80, 4 and 5).

All percentages are weight percentages.

Disclosed are asphalt emulsions that when combined with aggregate become suitable for slurry coating applications, and in particular micro surfacing applications, for the preservation of pavement. Various embodiments of this disclosure are well suited for use as a crack filler and for prevention of reflective cracking. Embodiments of this disclosure are more crack resistant than conventional micro surfacing emulsions, as demonstrated by a significant increase in cycles to failure in the Overlay Test. The slurry coating treatments enable use of a wide variety of asphalts for restoring and rejuvenating deteriorated road pavement.

The disclosed emulsion is a mixture of components that interact with one another. As a consequence, the concentration of one component may be increased within certain limits if the concentration of another is correspondingly decreased, without significantly altering the properties of the resulting composition. The disclosed emulsion, when combined with an aggregate may be applied to an existing base or substrate of a pavement. In certain embodiments, the disclosed emulsion includes an asphalt phase which includes asphalt and a polymer, and an aqueous phase, which includes an emulsifying agent in water. The disclosed emulsion desirably includes substantial asphalt content. For example, the asphalt concentration of the asphalt phase may be about 90% to about 97% by weight, and in some embodiments about 92% to about 96% by weight of the asphalt phase or 15% to 75%, or even 50% to 70% of the total weight of the emulsion.

In an alternative embodiment, the polymer may be applied as a dispersion and combined with the aqueous phase as opposed to a solid polymer applied to the asphalt phase. Alternatively, a combination of polymers in each phase may be employed. Those of ordinary skill in the with knowledge of this disclosure are capable of selecting a specific polymer or polymers and the appropriate delivery phase in order to achieve desired durability results to meet the preservation requirements of the intended pavement. The asphalt content is similar with either approach incorporating polymers.

The penetration test under ASTM D5 provides one mechanism for measuring the consistency and hardness of the asphalt or the residue of the asphalt after emulsion breaking. The distance that the needle penetrates in units of mm/10 measured is the penetration value. Soft asphalt has a high penetration value, and the converse is true for hard asphalt. For purposes of this disclosure, the residue for penetration testing may be obtained by ASTM D 6997, by AASHTO PP-72 (Method A or B), or any other method suitable for the recovery of residue from an asphalt emulsion.

The Overlay Test is a test method that determines the susceptibility of asphalt to fatigue or reflective cracking. The test is a standard test designated by the Texas Department of Transportation under reference code TEX-248-F. For purposes of this disclosure, the term Overlay Test refers to TEX-248-F and its addendum for flexible micro surfacing, dated Nov. 16, 2012. The test method, TEX-248-F, and its Nov. 16, 2012 addendum are herein incorporated by reference in their entirety. The test samples are generally residue specimens resulting from the combination of an emulsion with aggregate. The test results report cycles to failure with failure being defined as a 90% reduction or greater in the initial load value.

Various asphalt grades may be used in the disclosed asphalt emulsion composition depending on the expected pavement temperatures. The asphalt composition grades used in the emulsion may be defined by the Performance Grade (PG) values of the Strategic Highway Research Program (SHRP) or the American Association of State Highway and Transportation Officials (AASHTO) M320 standards. Embodiments contemplated within the scope of this disclosure generally rely upon penetration values according ASTM D5 that result in a residue recovered from the emulsion having a penetration value of about 110 units to about 160 units. The asphalt composition grades used for forming the emulsions may for example include penetration values of about 100 units to about 250 units to achieve the desired penetration values for the corresponding residue. The exemplified range of penetration values is generally recognized as "softer" asphalt grades by those of ordinary skill in the art. The initial utilization of the softer asphalt grades results in residue having the desired durability and Overlay Test results. Suitable examples of asphalt composition grades include PG-52, PG58-28, PG52-28, PG52-34, AC 5, AC 10, AC 15, AC 0, 150 pen, 120 pen, 120-150 pen, or150-200 pen. Those of ordinary skill in the art with knowledge of this disclosure are capable of selecting a specific performance grade of asphalt to achieve the desired penetration value of the residue for slurry coating applications.

The asphalts used may be, for example, oxidized or air-blown asphalts, non-oxidized asphalts and blends thereof. In other aspects, the asphalt includes, but is not limited to, asphalt produced from atmospheric distillation, vacuum distillation, solvent extraction, air, or combinations of these methods. Still other asphalts may include naturally occurring asphalts such as gilsonite, asphaltites, and the like.

Asphalt blowing, also referred to as oxidation or air rectification, may be used to produce oxidized or air blown asphalt of desired consistency from a softer asphalt than the final asphalt product yielded by the blowing process. The desired result of the blowing process is an increase in softening point and a reduction in penetration values over that of the starting, base asphalt. Typically, the blowing process includes heating the base asphalt, generally to a temperature of 232.2° C. (450° F.) to 260° C. (500° F.), and blowing air into the hot asphalt for a period of time required to yield the desired properties. The blowing process is a temperature-time dependent process with an inverse relationship of temperature and time. Thus, at higher temperatures the blowing time is generally less than the time required to achieve the same properties at lower temperature. The exchange surface or contact surface between the hot asphalt and the air forced into it generally also is a factor in determining the blowing process length and the required air quantity.

In some embodiments, the asphalt phase incorporates a polymer as a modifier to enhance specific physical characteristics of the resulting residue. Exemplary polymers include those that assist in providing desired properties for the asphalt emulsion residue, for example by, providing a stress-absorbing layer that strongly adheres to the underlying pavement, by providing a non-tacky surface, or by providing a polymer with a non-swelling nature. The polymers may for example be about 4% to 8% by weight of the asphalt phase or about 1% to about 15% by total weight of the emulsion.

Suitable polymers include any elastomer or plastomer suitable for asphalt applications. Non-limiting examples of such polymers include styrene-butadiene rubber, styrene-butadiene-styrene rubber, polychloroprene, styrene butadiene plastomers, polyurethanes, thermoplastic olefins, or thermoplastic polyamides.

In an alternative embodiment, the polymer may be incorporated into the aqueous phase of the emulsion. In such applications, the polymers are provided as a dispersion. Non-limiting examples include polymers derived from polyolefins such as vinyl acetate, vinyl chloride, vinylidene chloride, styrene, substituted styrene, butadiene, unsaturated polyesters, ethylene and the like. In some embodiments, the polymer is derived from acrylate monomers and mixtures thereof and polymerized with styrene or ethylene. In still other embodiments, the polymer is derived from butyl acrylate and copolymerized with styrene or ethylene. In yet other embodiments, the polymer is an acrylonitrile butadiene.

The emulsifying agents contemplated by this disclosure maintain the asphalt material in a stable suspension and control the emulsion breaking time. There are typically four categories of emulsifying agents, namely cationic, anionic, amphoteric and non ionic. Depending on the type of emulsifying agent used, an acid or a base may be needed to activate the emulsifying agent.

When cationic emulsifying agents are used, acid may be added to adjust the emulsion pH to between 1.0 and 7.0. Suitable acids include inorganic acids, for example hydrochloric acid and phosphoric acid. The acid promotes a positive charge on the emulsifying agent. A subcategory of cationic emulsifying agents, known as quaternary ammonium salts, do not require acid activation because the charge is built into the emulsifying agent. Exemplary cationic emulsifying agents include polyamines, fatty amines, fatty amido-amines, ethoxylated amines, propoxylated amines, diamines, imidazolines, quaternary ammonium salts, and mixtures thereof.

When anionic emulsifying agents are used, a base may be added to adjust the emulsion pH to between 7.0 and 12.0. Suitable bases include inorganic bases, for example sodium hydroxide and potassium hydroxide. The base promotes a negative charge on the emulsifying agent. Exemplary anionic emulsifying agents include alkali metal or ammonium salts of fatty acids, alkali metal polyalkoxycarboxylates, alkali metal N-acylsarcosinates, alkali metal hydrocarbylsulphonates, for example, sodium alkylsulphonates, sodium arylsulphonates, sodium alkylarylsulphonates, sodium alkylarenesulphonates, sodium lignosulphonates, sodium dialkylsulphosuccinates and sodium alkyl sulphates, long chain carboxylic and sulphonic acids, their salts and mixtures thereof.

When amphoteric emulsifying agents are used both the cationic and anionic chemical functionality are built into the same molecule. Therefore, either functionality may be activated; the cationic portion may be activated by acid or the anionic portion may be activated by base. Exemplary amphoteric emulsifying agents include betaines and amphoteric imidazolinium derivatives.

When nonionic emulsifying agents are used, it may not be necessary to activate the emulsifying agent with either acid or base. Exemplary non-ionic emulsifying agents include ethoxylated compounds and esters, for example ethoxylated fatty alcohols, ethoxylated fatty acids, sorbitan esters, ethoxylated sorbitan esters, ethoxylated alkylphenols, ethoxylated fatty amides, glycerine fatty acid esters, alcohols, alkyl phenols, and mixtures thereof.

The amount of emulsifying agent should preferably be sufficient to maintain a stable emulsion. The concentration can vary based on the type of emulsifying agents used and other components of the emulsion but is generally from greater than 0 to about 5% by weight of the emulsion.

The emulsion may contain other additives to adjust the emulsion properties in relation to the planned use, application method, and storage conditions. Non-limiting examples of additives include stabilizing agents, adhesion promotors, biocides, anti-freeze agents, break control additives, peptizing agents, asphalt additives, curing promoters, pH adjusters, viscosity modifiers, tackiness control additives, pigments, UV resistance additives, surface active agents, or combinations thereof.

The weight percentage of the asphalt phase of the emulsion may for example represent from about 15% to about 75% of the total emulsion weight. The corresponding aqueous phase of the emulsion may for example represent from about 70% to about 30% of the total emulsion weight. The emulsifying agents or other additives may represent from about 0.0001% to about 20.0% of the total emulsion weight, and preferably from about 0.01% to about 3.0% of the total emulsion weight.

The disclosed asphalt emulsions may be prepared by mixing, in no specific order, the emulsifying agent, water, and in some embodiments the polymer, and adjusting the pH of the resulting emulsifying agent solution depending on the emulsifying agent type. The emulsifying agent solution may for example be heated from slightly above room temperature to up to about 70° C. Separately, the asphalt and polymer blend may for example be heated to 130° C. to 160° C., depending upon the viscosity of the asphalt and polymer used. The emulsion may be formed at ambient pressure or under pressure with subsequent cooling to below 100° C. (212° F.) before exposure to the atmosphere. The asphalt and polymer blend and the emulsifying agent solution may be mixed or injected into a high-speed, high shear mechanical mixer, such as a colloid mill or other equipment capable of emulsifying the constituents to produce the asphalt emulsion. The temperature of the finished emulsion desirably is maintained, for example, below about 15° C. to about 75° C., in some embodiments from about 25° C. to about 60° C., or even from about 35° C. to about 50° C. The use of such temperatures permits operation of the mixer at ambient pressure and avoids boiling the aqueous phase and consequent interference with the emulsification process. The ratio of the asphalt and emulsifying agent solution is adjusted to produce an asphalt emulsion containing a desired amount of asphalt material, which may for example be from 30% to 70%.

In the above-described method, the polymer may be added into the aqueous phase or the asphalt phase. In certain applications with multiple polymers, both phases may contain a polymer. Alternatively, the asphalt emulsion can be produced with direct injection, where the asphalt and emulsifying agent (without the polymer) are injected into the colloid mill through individual supply lines and the polymer is directly injected into the asphalt supply line just ahead of the colloid mill. The polymer-modified asphalt can also be produced by post-addition, where the desired amount of the polymer is added into a pre-manufactured emulsion containing asphalt but without the polymer.

The emulsion should remain stable during storage and typically may be stored for about 14 days, depending on the constituents. Some settling may occur, but a light (simple) agitation of the emulsion usually re-disperses asphalt into the emulsion.

A final emulsion may also be prepared from a concentrate emulsion by diluting the concentrate emulsion with sufficient additional water to provide the desired asphalt or additive content in the final emulsion.

The specific weight percentages of the asphalt phase and the aqueous phase in the final emulsion may be chosen depending on factors such as the preexisting pavement composition or the base course materials and conditions, the desired cure time, and user agency regulations or specifications. Similarly, the emulsifying agents and other additives may be adjusted for specific application conditions, asphaltic materials, and substrates.

The final emulsion may be prepared in advance of its application or at a work site immediately before its application. If desired, the concentrate may be mixed with water at a rate sufficient to produce the desired final emulsion on a continuous basis during application using metering and mixing equipment known to those skilled in the art.

The polymer-modified asphalt emulsion may be combined with aggregate to from a coating composition that is well suited for pavement preservation applications, such as micro surfacing. A micro surfacing paving composition produced according to this disclosure, when applied to pavement and cured, demonstrates a level of durability not currently achieved with the use of conventional micro surfacing emulsions. For purposes of this disclosure, durability indicates the longevity of the applied micro surfacing composition and its resistant to cracking.

Most resurfacing aggregates known or used for pavement are suitable for use with the polymer-modified asphalt emulsion of this disclosure. The International Slurry Surfacing Association (ISSA) categorizes aggregate generally utilized for micro surfacing compositions as Type II or Type III (as defined by the ISSA A143 standard aggregate grading scale). Either form may be suitable for use with the polymer-modified emulsion of this disclosure. Non-limiting examples of aggregates that are within the ISSA A143 standard.

Some embodiments of the micro surfacing paving composition may comprise other optional additives. For example a mineral filler may be employed as an additive in the micro surfacing paving composition. Suitable mineral fillers may include those categorized under ASTM D242. Non-limiting examples of specific materials include portland cement (Type: I, II, I/II, III, IV, or V), hydraulic cement, hydrated lime, agricultural lime, fly ash, pot ash, rock dust and slag dust.

The design of the micro surfacing paving composition and the varying components may be addressed through the use of standard methods published under ISSA. Non-limiting examples of standards methods employed aiding in the formulation of micro surfacing paving compositions include: ISSA Technical Bulletin No. 100, "Test Method for Wet Track Abrasion of Slurry Surfaces,": ISSA Technical Bulletin No. 109, "Test Method for Measurement of Excess Asphalt in Bituminous Mixtures by Use of a Loaded Wheel Tester and Sand Adhesion,": ISSA Technical Bulletin No. 139, "Test Method to Classify Emulsified Asphalt/Aggregate Mixture Systems by Modified Cohesion Tester Measurement of Set and Cure Characteristics.": ISSA A-143 "Recommended Performance Guidelines for Micro-Surfacing": ISSA Technical Bulletin No. 144, "Test Method for Classification of Aggregate Filler-Bitumen Compatibility by Schulze-Breuer and Ruck Procedures," and: ISSA Technical Bulletin No. 147, "Test Methods for Measurement of Stability and Resistance to Compaction, Vertical and Lateral Displacement of Multilayered Fine Aggregate Cold Mixes." The results of such test methods enable one of ordinary skill in the art to tailor the micro surfacing paving composition to reach desired characteristics for an application.

In one embodiment, the micro surfacing paving composition may be optimized by utilizing ISSA A-143 "Recommended Performance Guidelines for Micro-Surfacing" or similar practice. Once the optimization under A-143 has been completed, further optimization can be made through use of the Overlay Test as set forth in this disclosure. The Overlay Test may then be used to determine the optimum emulsion content or optimum emulsion content range to provide the best results for the specific aggregate, gradation, and emulsion combination.

The micro surfacing paving composition may be generated with the use of conventional mixing equipment used in the paving industry. For example, the polymer-modified asphalt emulsion may be combined with aggregate and optional additives in a pug mill for form a micro surfacing paving composition. The aggregate may comprise about 70% by weight to about 95% by weight of the micro surfacing paving composition. The polymer-modified asphalt emulsion may for example represent greater than 10%, greater than 12%, greater than 14%, or even greater than 16% by weight of the micro surfacing paving composition. The other optional additives may represent up to about 5% by weight of the micro surfacing paving composition.

The final micro surfacing paving composition may be applied to pavement using conventional spreading techniques, such as a spreading box, surfacing box or both. A recommended application rate may be, for example, about 5 kg/square meter to about 20 kg/square meter or a thickness ranging from about 0.6 cm to about 2.5 cm. The application rate may also vary depending on the specified application conditions, micro surfacing paving composition, the surface to which it is applied, and the nature of the permanent materials or base (viz., the pavement structure), and other similar factors.

The resulting micro surfacing pavement composition, upon emulsion breaking, has a penetration value of 110-160 units according ASTM D5 and exhibits a resistance to cracking as demonstrated by a value according to the Overlay Test of greater than 50 cycles to failure. In certain embodiments the residue may have a penetration value of 130-150 units according ASTM D5. Additionally, certain embodiments exhibits a resistance to cracking as demonstrated by a value according to the Overlay Test of greater than 100 cycles to failure, greater than 125 cycles to failure, or greater than 150 cycles to failure. The demonstrated values for the Overlay test represent an improvement of at least 5 times greater than conventional micro surfacing emulsions and some exhibit as much as 10, or even 20 times greater than conventional micro surfacing emulsions.

The disclosed composition is further illustrated in the following non-limiting examples. Various modifications and alterations of the disclosed compositions will be apparent to those skilled in the art without departing from the scope of this disclosure.

EXAMPLES

Procedure for Conducting Micro-Surfacing Overlay Samples: TEX-248-F and its addendum for flexible micro surfacing, dated Nov. 16, 2012. The Examples for testing are cast and prepared according the procedure set forth in 248F and the corresponding addendum for the micro-surfacing Overlay Test. The Examples are tested Asphalt Materials Performance Tester (AMPT) from IPC Global. The UTS-36 Overlay Test Software is selected on the AMPT and the air is turned on. The specimen information is inserted on the device and following parameters are set.

Target Temperature—5° C.
Pre-Test Relaxation period—10
Target Displacement—1.27
Loading Pulse width—60000
Termination load—90
Maximum Number of Cycles—500

The Example is then placed into the jig on the AMPT and the bolts on the jug tightened. Once all eight bolts are in place, adjust the AID External LVDT to read −0.700. Lower the chamber and wait for the chamber to reach test temperature. Once at test temperature press start and AMPT. The AMPT will indicate when testing is completed and will provide the results.

Examples 1 and 2: Polymer-modified asphalt emulsions were produced to demonstrate the enhanced durability of the compositions of this disclosure. Each of the Examples were prepared by mixing the materials shown in Table 1 at the weight percentages indicated in Table 2. Example 1 was produced in accordance with conventional micro surfacing emulsions. Example 2 was produced as an embodiment of this disclosure. For both Examples, the emulsifying agent was mixed with water to form and aqueous phase and its pH adjusted to below 2.5. The resulting emulsifying agent solution was heated from slightly above room temperature to about 60.° C. Separately, the asphalt and polymer were heated to about 130° to 175° C. The emulsifying agent solution and heated asphalt were injected into a colloid mill to produce the asphalt emulsion. The temperature of the finished emulsion was maintained below about 100° C. (212° F.). The emulsions were combined with Grade 2 aggregate from Capital Aggregate, Marble Falls, TX, mineral filler, and water by hand mixing. Multiple test samples were produced with each Examples to form micro surfacing paving compositions at 12.5%, 13.5%, 14.5% and 15.5% by weight of dry aggregate. Additional water was added each sample, as needed to maintain the desired consistency.

Figure 2:
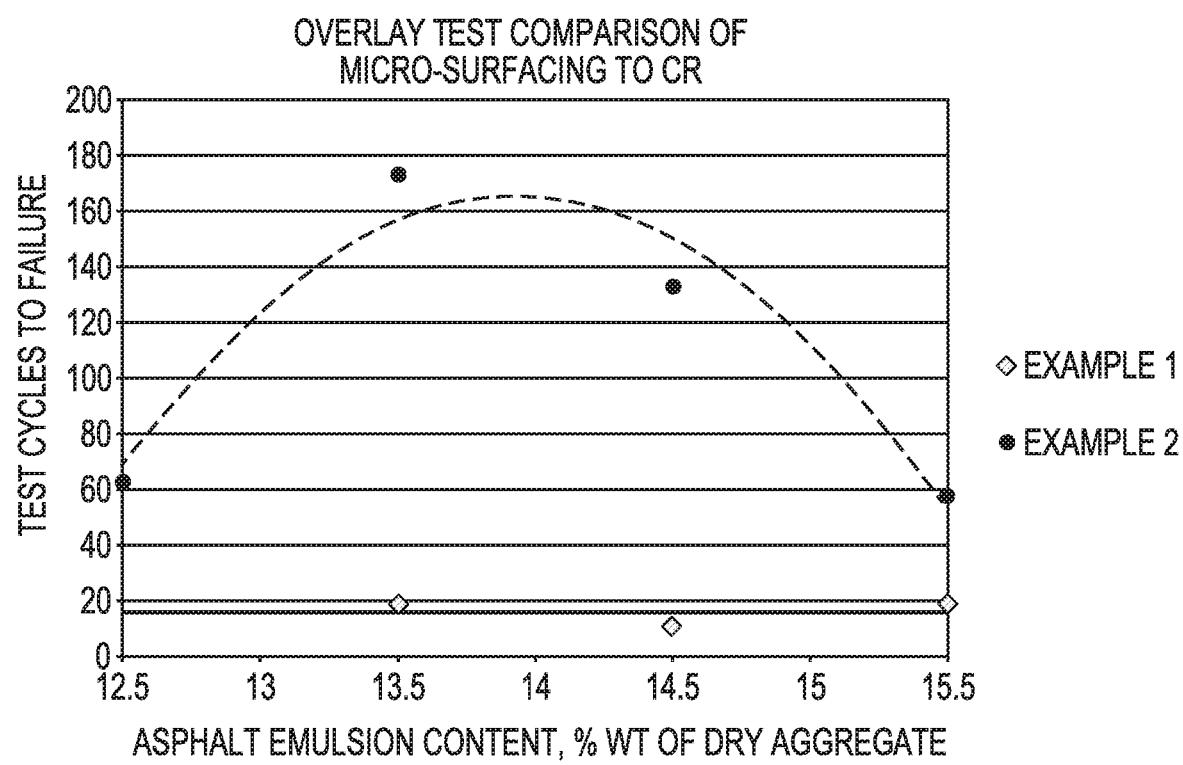
FIG. 2 is a graph depicting the Overlay test results and the impact of the emulsion content.

The Examples were then subjected to the Overlay Test. The results of the Overlay test are reported in Table 3. FIG. 1 indicates the results of the Overlay Test for Examples 1 and 2 at a 12.5% by weight of asphalt emulsion content with the aggregate. Overlay Testing on Example 1 resulted in less than 20 cycles to failure while Example 2 went substantially beyond that to a level of about 170 cycles to failure. FIG. 2 demonstrates the impact on the varying levels of asphalt emulsion content with the emulsion of Example 1 and 2. With example 1, the varying asphalt emulsion content had relatively little impact on the results of the Overlay Test. Example 2 demonstrates improved Overlay Test results over Example 1. Additionally, FIG. 2 indicates that there is an optimum level of asphalt emulsion content that was achieved near 13.5% to about 14%.

TABLE 1

Materials

| | |
|---|---|
| Asphalt 1 | PG 64-22 from Ergon Asphalt & Emulsions, Inc. Jackson, MS, pen value ~62 |
| Asphalt 2 | 65 wt %/35 wt % blend of 120/150 pen from Ergon Asphalt & Emulsions, Inc. Jackson, MS, pen value ~135 and Flux from Ergon Refining Inc. Jackson, MS, pen value 265 |
| Polymer 1 | SBR latex from BASF, Charlotte NC |
| Polymer 2 | SBS from Kraton, Belpre, Ohio |
| Emulsifying Agent | Tall-Oil Maleated Imido-Amine, Corsitech Inc., Houston, TX |
| HCl | 20 Baume HCl |
| Water | |
| Mineral Filler | Portland Cement (Type I/II) |
| Aggregate | Grade 2 from Capital Aggregate, Marble, TX |

TABLE 2

Examples

| Raw Material | Example 1 Wt % | Example 2 Wt % |
|---|---|---|
| Asphalt 1 | 58.2 | |
| Asphalt 2 | | 57.14 |
| Polymer 1 | 3.2 | |
| Polymer 2 | | 6 |
| Emulsifying Agent 1 | 1.5 | 2.2 |
| HCL | 1.2 | 1.8 |
| water | 35.90 | 32.86 |

TABLE 3

Examples 1 and 2 with varying emulsion contents.

| Example | Asphalt Emulsion Content, % wt of Dry Aggregate | Cycles to Failure |
|---|---|---|
| 1 | 12.5 | — |
| 2 | 12.5 | 63 |
| 1 | 13.5 | 19 |
| 2 | 13.5 | 174 |
| 1 | 14.5 | 11 |
| 2 | 14.5 | 133 |
| 1 | 15.5 | 19 |
| 2 | 15.5 | 58 |

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof

What is claimed is:

1. A polymer-modified asphalt emulsion comprising:
   a stable liquid emulsion containing an asphalt phase comprising an asphalt and a polymer, and
   an aqueous phase comprising water and an emulsifying agent, wherein the asphalt has a penetration value of 100 to 250 according to ASTM D5, the polymer comprises from 4% to 8% by weight of the total weight of the asphalt phase, and a residue recovered from the emulsion after emulsion breaking has a penetration value of 110 to 160 according to ASTM D5 and exhibits a resistance to cracking as demonstrated by a value according to the Overlay Test of greater than 50 cycles to failure.

2. A polymer-modified asphalt emulsion according to claim 1, wherein the residue recovered from the emulsion has a penetration value of 130 to 150 according to ASTM D5.

3. A polymer-modified asphalt emulsion according to claim 1, wherein the residue exhibits a resistance to cracking as demonstrated by a value according to the Overlay Test of greater than 100 cycles to failure.

4. A polymer-modified asphalt emulsion according to claim 1, wherein the asphalt comprises from about 92% to about 96% by weight of the total weight of the asphalt phase.

5. A polymer-modified asphalt emulsion according to claim 1, wherein the polymer comprises styrene-butadiene rubber, styrene-butadiene-styrene rubber, polychloroprene, styrene butadiene plastomer, polyurethane, thermoplastic olefin or thermoplastic polyamide.

6. A polymer-modified asphalt emulsion according to claim 1, wherein the polymer comprises elastomer or plastomer.

7. A polymer-modified asphalt emulsion according to claim 1, wherein the emulsifying agent comprises from about 0.01% to about 5% by weight of the total weight of the emulsion.

8. A polymer-modified asphalt emulsion according to claim 1, wherein the is selected from cationic emulsifiers, anionic emulsifiers, non-ionic emulsifiers, and amphoteric emulsifiers.

9. A polymer-modified asphalt emulsion according to claim 1, further comprising an additive selected from stabilizing agents, adhesion promotors, biocides, anti-freeze agents, break control additives, peptizing agents, asphalt additives, curing promoters, pH adjusters, viscosity modifiers, tackiness control additives, pigments, UV resistance additives, surface active agents, and combinations thereof.

10. A micro surfacing paving composition comprising the polymer-modified asphalt emulsion of claim 1 and aggregate.

11. A micro surfacing paving composition according to claim 10, wherein the polymer-modified asphalt emulsion comprises greater than 10% by weight of the micro surfacing paving composition.

12. A micro surfacing paving composition according to claim 10, wherein the aggregate comprises Type II or Type III aggregate according to the ISSA A143 standard aggregate grading scale.

13. A micro surfacing paving composition according to claim 10, further comprising a mineral filler categorized under ASTM D242.

14. An article comprising pavement with an aggregate-filled residue after emulsion breaking of the micro-surfacing paving composition of claim 10 applied thereon.

15. An article according to claim 14, wherein a residue recovered after emulsion breaking of the micro surfacing paving composition has a penetration value of 130 to 150 according to ASTM D5.

16. An article according to claim 14, wherein a residue recovered after emulsion breaking of the micro surfacing paving composition exhibits a resistance to cracking as demonstrated by a value according to the Overlay Test of greater than 100 cycles to failure.

17. A method comprising:
applying onto a paved surface,
(a) a polymer-modified asphalt emulsion comprising:
a stable liquid emulsion containing an asphalt phase comprising an asphalt and a polymer, and
an aqueous phase comprising water and an emulsifying agent; and
(b) aggregate, and breaking the emulsion to form a residue bonded to the paved surface, wherein the asphalt has a penetration value of 100 to 250 according to ASTM D5, the polymer comprises from 4% to 8% by weight of the total weight of the asphalt phase, and a residue recovered from the emulsion after emulsion breaking has a penetration value of 110 to 160 according to ASTM D5 and exhibits a resistance to cracking as demonstrated by a value according to the Overlay Test of greater than 50 cycles to failure.

18. A polymer-modified asphalt emulsion comprising: a stable liquid emulsion comprising an asphalt, a polymer, water and an emulsifying agent, wherein the asphalt has a penetration value of 100 to 250 according to ASTM D5, the polymer comprises from 4% to 8% by weight of the total weight of the asphalt phase, and a residue recovered from the emulsion after emulsion breaking has a penetration value of 110 to 160 according to ASTM D5 and exhibits a resistance to cracking as demonstrated by a value according to the Overlay Test of greater than 50 cycles to failure.

19. A polymer-modified asphalt composition according to claim 18, wherein the polymer is added with the water as an aqueous dispersion.

* * * * *